US012802237B2

(12) United States Patent
Dai

(10) Patent No.: US 12,802,237 B2
(45) Date of Patent: Nov. 17, 2026

(54) SYSTEMS AND METHODS FOR DIRECTIONAL INTERPOLATION FILTER

(71) Applicant: Agora Lab, Inc., Santa Clara, CA (US)

(72) Inventor: Wei Dai, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 183 days.

(21) Appl. No.: 18/976,022

(22) Filed: Dec. 10, 2024

(65) Prior Publication Data

US 2026/0162274 A1 Jun. 11, 2026

(51) Int. Cl.

| | |
|---|---|
| ***G06T 7/13*** | (2017.01) |
| ***G06T 5/20*** | (2006.01) |
| ***G06V 10/25*** | (2022.01) |
| ***G06V 10/75*** | (2022.01) |

(52) U.S. Cl.
CPC .................. *G06T 7/13* (2017.01); *G06T 5/20* (2013.01); *G06V 10/25* (2022.01); *G06V 10/751* (2022.01)

(58) Field of Classification Search
CPC .. G06T 7/13; G06T 5/20; G06V 10/25; G06V 10/751
USPC .......................................................... 382/199
See application file for complete search history.

(56) References Cited

U.S. PATENT DOCUMENTS 7,283,663 B2 * 10/2007 Sobel .................... G06T 3/4007 382/162
2006/0056722 A1 * 3/2006 Moroney .................. G06T 5/20 382/266

OTHER PUBLICATIONS

Zhou, Dengwen, Xiaoliu Shen, and Weiming Dong. "Image zooming using directional cubic convolution interpolation." IET image processing 6.6 (2012): 627-634. (Year: 2012).*
Ugur, Kemal, et al. "High performance, low complexity video coding and the emerging HEVC standard." IEEE Transactions on Circuits and Systems for Video Technology 20.12 (2010): 1688-1697. (Year: 2010).*

* cited by examiner

*Primary Examiner* — Jonathan S Lee
(74) *Attorney, Agent, or Firm* — IP Strategy Consulting

(57) ABSTRACT

Systems and methods for the directional interpolation filter for video compression is provided. In some embodiments, the methods and systems for directional interpolation initially determine an angle of directional interpolation for a given pixel in a region of interest. The angle may be determined by performing edge detection for a textural edge in the region of interest and aligning the angle with an angle for the detected edge. Alternatively, the angle may be determined by applying a predictive method. The tap length for the pixel interpolation may also be determined. Determining tap length is an optimization between tap size and desired precision. Once tap length is determined, the systems and methods may interpolate the pixel along the angle by the determined tap length. This interpolation may include interpolation along the angle of integer pixels, or alternatively may include deriving intermediate pixels from integer pixels, and interpolation along the intermediate pixels.

20 Claims, 17 Drawing Sheets

400B

400E

SYSTEMS AND METHODS FOR DIRECTIONAL INTERPOLATION FILTER

BACKGROUND

The present invention relates in general to the field of video compression, and more specifically to methods, computer programs and systems for directional interpolation filtering.

Video compression standards are designed to enable reduced bandwidth and size of video content, while maintaining high levels of video quality. Current High Efficiency Video Coding (HEVC) is a video compression standard that offers significant data compression as compared against Advanced Video Coding (AVC) with comparable levels of video quality at the same or similar bit rate. HEVC uses both integer discrete cosine transform (DCT) with varied block sizes and discrete sine transform (DST) for 4×4 block sizes. Essentially, the standard compares different parts of a frame of the video to find areas that are redundant both within a single frame and between consecutive frames. Redundant areas are then replaced with short descriptions instead of the original pixels.

An essential part of HEVC is the usage of motion vector (MV) prediction. MV is a form of motion estimation that describes the transformation from one 2D image to another. Typically, this occurs between adjacent frames in the video sequence. Motion vectors may relate to the whole image (global motion estimation) or specific parts, such as rectangular blocks or arbitrary patches or even on a per pixel basis. In HEVC, a motion vector is defined as a two-dimensional vector used for inter prediction that provides an offset from the coordinates in the current picture to the coordinates in a reference picture.

In current HEVC, to balance precision of MV and coding cost of encoding the MV, a quarter pixel accuracy of the MV has been adopted. For more advanced video coding standards, higher precision MV may be utilized. In order to get the fractional-pixel value in the previous video frame with the suggested fractional-pixel MV, interpolation is employed. Interpolation is a type of estimation to construct new data points based on the range of a discrete set of known data points. Current interpolation techniques used multiple tap filters in the horizontal and/or vertical directions. When the half pixel is in line with an integer pixel, this interpolation technique is relatively straight forward. However, if the half pixel is out of line with the integer pixels, then a multiple tap filter either vertically or horizontally with half pixels that are in line with the integer pixels may be employed. In some embodiments, a 6-tap filter is generally employed, in other embodiments 8-tap filters may be employed, and in yet other embodiments, a 7-tap filter may be employed. Longer tap filters provide greater precision at the cost of coding complexity. For quarter pixel interpolation, a bilinear interpolation with neighboring integer and half-pixels may be employed.

However, current interpolation techniques do not provide the precision of fractional pixels that are desired. In advanced video coding standards, the tap of the filter will be larger to meet the precision demands. Regardless of tap length, however, current interpolation remains in the horizontal and vertical directions. When the image being interpolated has an existing edge or motion vectoring, often these are not in the vertical or horizontal direction. This may result in the loss of high frequency energy. All interpolation filters are a types of low pass filters. Fewer taps result in stronger low pass filtering.

Given that there is great value in using lower tap filters, directional interpolation filtering systems and methods are provided.

SUMMARY

The present systems and methods relate to video compression, and particularly directional interpolation filter when video coding. Such systems and methods enable higher precision motion vectoring at lower bitrates.

In some embodiments, the methods and systems for directional interpolation initially determine an angle of directional interpolation for a given pixel in a region of interest. The angle may be determined by performing edge detection for a textural edge in the region of interest and aligning the angle with an angle for the detected edge. Alternatively, the angle may be determined by applying a predictive method. The predictive method may entail estimating a pixel value of a sub-pixel position, identifying a similar integer pixel within a predefined range, and predicting current location of the sub-pixel using a weighted average of the similar integer pixel. Weights used in the weighted average are determined by at least one of distance between the similar integer pixel and the current location of the sub-pixel and difference between the similar integer pixel and the current sub-pixel.

Additionally, the tap length for the pixel interpolation may be determined. Determining tap length is an optimization between tap size and desired precision. In some cases, the tap length is shorter when the angle is aligned with a textural angle for the region of interest and longer when the angle is not aligned with the textural angle. In other embodiments, the tap length is an on-the-fly trained filter tap coefficient derived by sending all coefficients to a decoder.

Once tap length is determined, the systems and methods may interpolate the pixel along the angle by the determined tap length. This interpolation may include interpolation along the angle of integer pixels, or alternatively may include deriving at least two intermediate pixels from integer pixels, and interpolation along the angle of the at least two intermediate pixels.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for directional interpolation when coding video content. In some embodiments, the disclosure will specifically focus on 6-tap, 7-tap and 8-tap filtering; however, this is intended to be illustrative and non-limiting. Longer tap filters may be employed in order to gain additional precision. In some embodiments, filters of up to 12-tap may be employed. Most commonly, 4, 6 and 8 tap filters are employed. Larger tap increases complexity however, so generally there is a balance between precision and complexity to arrive at an ideal tap length. Directional interpolation enables lower tap numbers as compared against traditional vertical and horizontal interpolation filtering.

Figure 1:
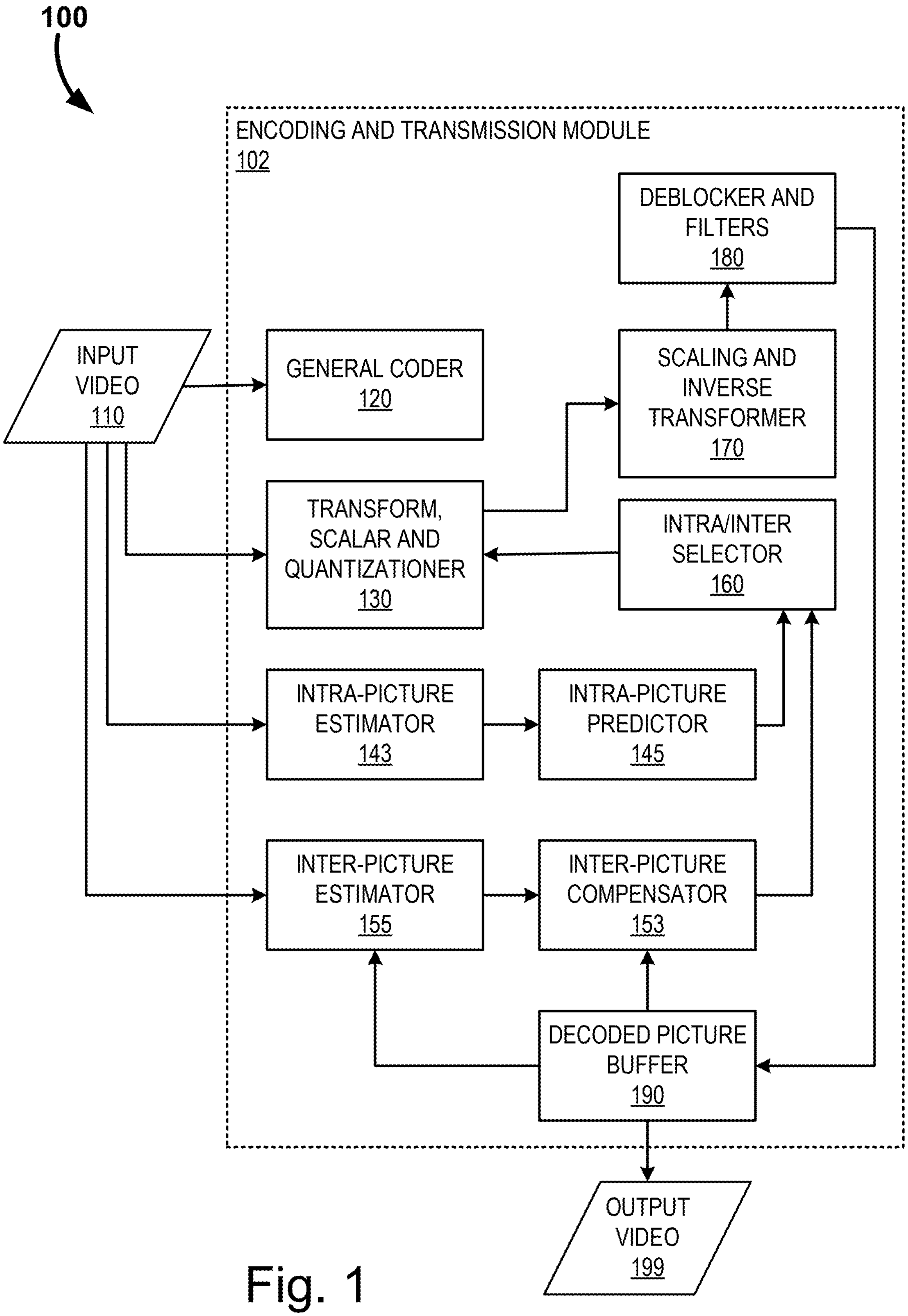
FIG. 1 is an example block diagrams of a system for encoding and transmitting video content, in accordance with some embodiment.

To facilitate discussions, FIG. 1 is an example of a system for High Efficiency Video Coding (HEVC), shown generally at 100. Coding standards are designed to achieve the highest coding efficiency possible. Coding efficiency is the ability to encode video at a minimized bitrate while achieving a quality threshold. The encoder system 102 splits an inbound picture into block shaped regions for a first picture frame, or the first frame of a random-access point using intra-picture prediction. Intra picture prediction is where prediction of blocks/pixels in the given frame is predicted by using other pixels within the same frame. After the first frame is predicted using intra-picture prediction, the other frames may be predicted using inter-picture prediction techniques. Inter-picture prediction is the prediction of block content based upon the adjacent frame data. After prediction methods are finished, the picture goes through loop filters and the final picture representation is stored in a decoded picture buffer. Images stored in the decoded picture buffer are available for use to predict yet other pictures.

In this system an input video 110 is received by a number of sub-components of the encoding and transmission module 102. These sub components include a general coder 120 and transform, scalar and quantizationer 130, intra-picture estimator 143 and an inter-picture estimator 155. The general coder 120 generates general control data, which is provided to the header formatting and CABAC to incorporate into the coded bitstream. General control data is also provided to the transform, scalar and quantizationer 130, the intra-picture estimator 143, and the inter-picture estimator 155 (not illustrated).

Transform, scalar and quantizationer 130 performs scaling and transform functions on the input video frame and provided output as quantized transform coefficients to the header formatting and a context-adaptive binary arithmetic coding (CABAC) algorithm to incorporate into the coded bitstream. Output is also provided to the scaling and inverse transformer 170. Transform units of various sizes may be used to code the prediction residuals. These transform units may be transformed using discrete cosine transforms or discrete sine transforms. The scaling and inverse transformer 170 in turn provides output to the deblocker and filtering module 180, as well as the intra-picture estimator 143 and intra-picture predictor 145.

The intra-picture estimator 143 uses a variety of prediction algorithms to estimate pixel values from neighboring pixels within the same frame. Output from the intra-picture estimator 143 is provided to an intra-picture predictor 145 which consumes the estimations and generates a prediction of the pixels of interest. Conversely, an inter-picture estimator 155 received adjacent frame data from a decoded picture buffer 190 and estimates motion between one frame to an adjacent frame. Output of the motion estimation is provided to the inter-picture compensator 153 as well as the header formatting and CABAC to incorporate into the coded bitstream (not illustrated).

The inter-picture compensator 153 generates motion compensation information. A directional interpolation filter is used to generate prediction pixels and is used in motion compensation and may form part of the inter-picture compensator 153.

A selector 160 picks between the intra-picture predicted image data and the inter-picture motion compensated data. This information is fed back to the transform, scalar and quantizationer 130 and the deblocker and filtering module 180 (not illustrated).

The deblocker and filtering module 180 generates filtering control data, which is provided to the header formatting and CABAC to incorporate into the coded bitstream (not illustrated). Deblocked and filtered data is also provided to the decoded picture buffer 190. Output of the decoded picture buffer 190 includes the output video 199.

Figure 2:
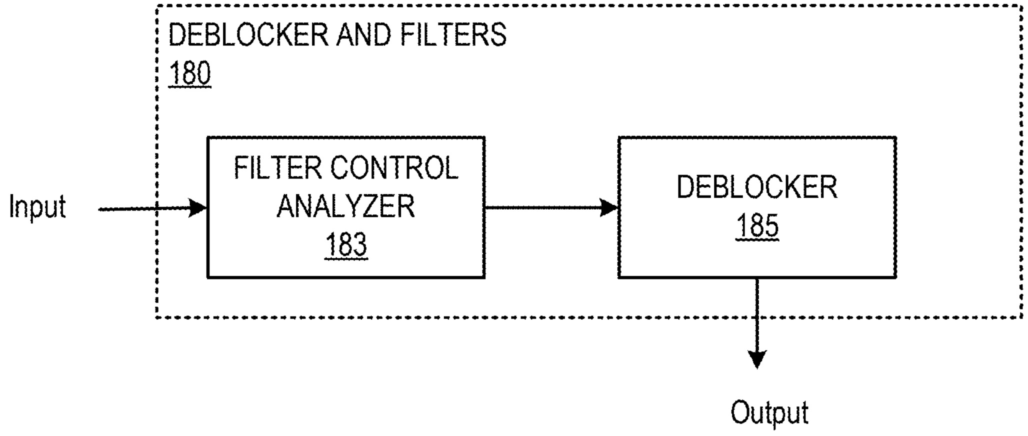
FIG. 2 is an example block diagram for the deblocker and filter module, in accordance with some embodiments.

Details of the deblocker and filtering module 180 are provided in relation to the block diagram of FIG. 2. Various inputs are first processed by a filter control analyzer 183 which outputs the filter control data. A deblocker 185 deblocks the image data. Two or more loop filters (not illustrated) may be applied sequentially with the deblocking filter applied first and a sample adaptive offset filter applied after the loop filters. Both loop filters are applied in the inter-picture prediction loop. The sample adaptive offset filter is applied after the deblocking filter and is designed to allow for better reconstruction of the original signal amplitudes by applying offsets stored in a lookup table in the bitstream.

Figure 3A:
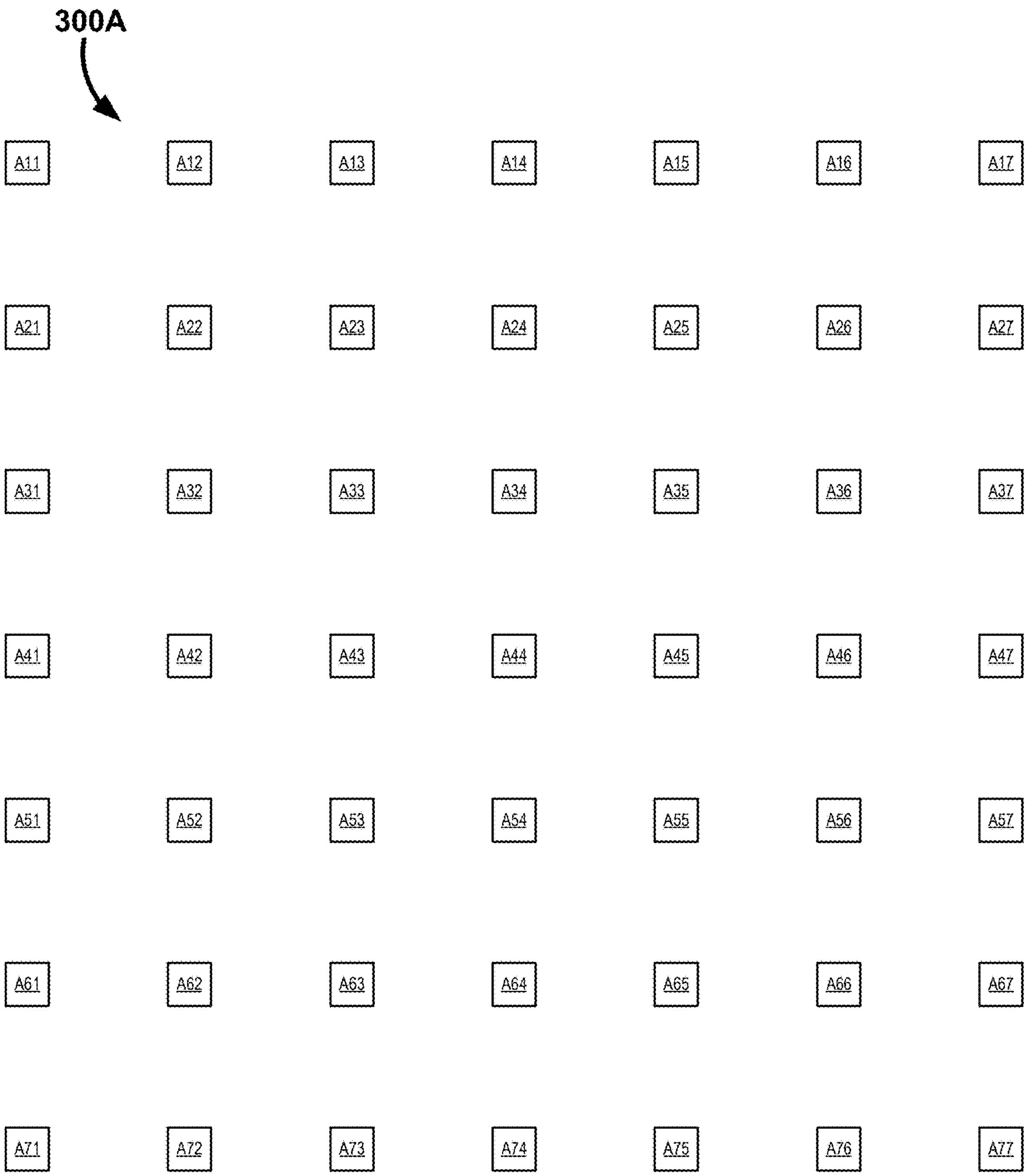
FIG. 3A is an example illustration of a pixel array, in accordance with some embodiments.

Turning now to FIG. 3A, an example of a series of pixels comprising a small region of a picture is provided at 300A. This example pixel field includes 7×7 or 49 integer pixels. These pixels are labeled as "A" and a pair of numbers. The "A" indicates these are integer pixels. The first number indicates the row, and the second number indicates the column. This example illustration is limited by page size and the ability to have sufficient resolution of the 'pixels', thereby limiting the size to 49 pixels. Other example illustrations within this document may include more or fewer pixels. Again, this is not limiting, but rather an artifact of the available image size. Additionally, pixels that are not illustrated may be referenced within this document. For example, pixel 'A03' would reside directly above pixel 'A13' if this pixel field were to be extrapolated out.

Figure 3B:
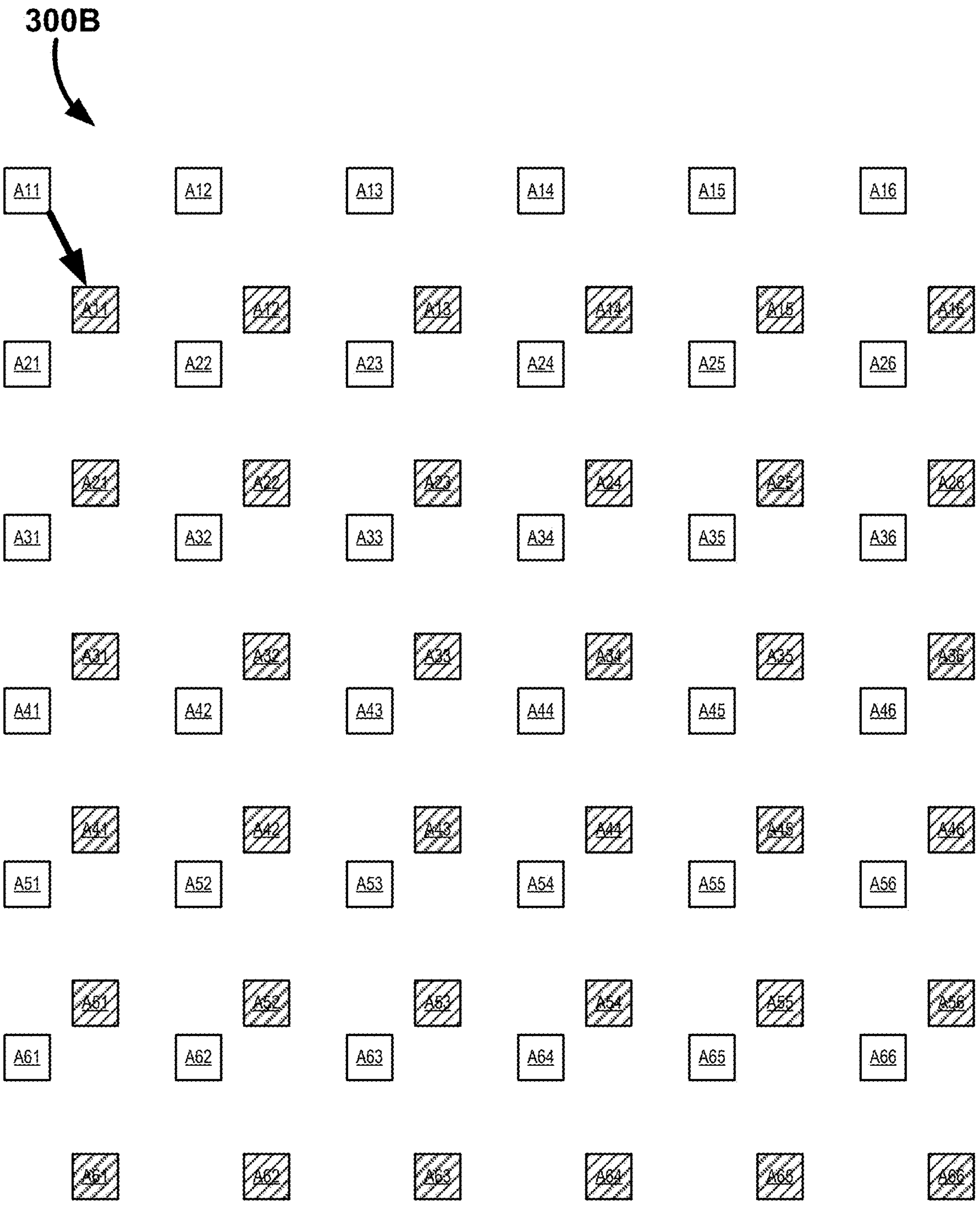
FIG. 3B is an example illustration of a Motion Vector (MV) between a reference pixel array and a current pixel array, in accordance with some embodiments.
Figure 3C:
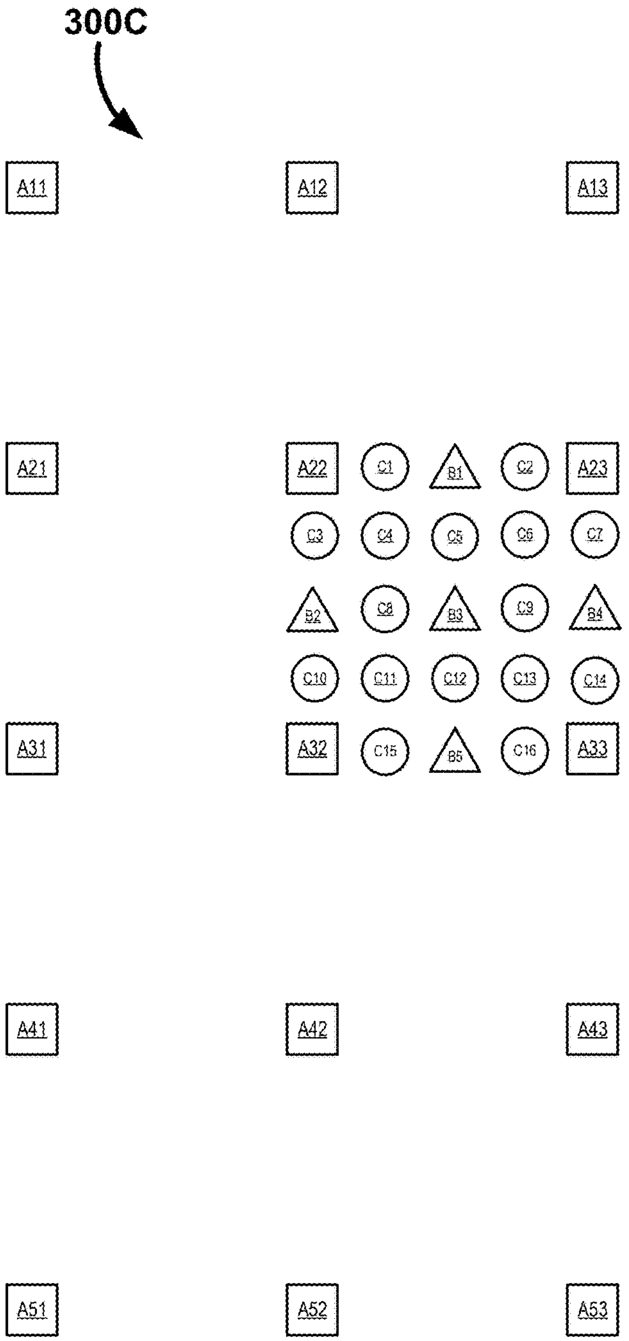
FIG. 3C is an example illustration of a pixel array including half and quarter pixels, in accordance with some embodiments.

Turning to FIG. 3B, the concept of a motion vector (MV) is illustrated, as seen generally at 300B. The previous pixel field is illustrated, however now a shifted pixel filed is also illustrated by the shaded blocks. The arrow illustrates a motion vector that indicates how the pixels are shifted from one picture frame to the previous picture frame. In some cases, the motion vector may be a fractional-pixel precision MV. This requires the system to encode half and quarter pixels. FIG. 3C provides another view of the pixel filed, now with certain half pixels (identifiable as triangular) and quarter pixels (identifiable as circles) illustrated, as seen generally at 300C. Half pixels are identified by the letter "B", while quarter pixels are identified by the letter "C". The half and quarter pixels are followed by a number in order from left to right from the top row downwards.

Figure 4A:
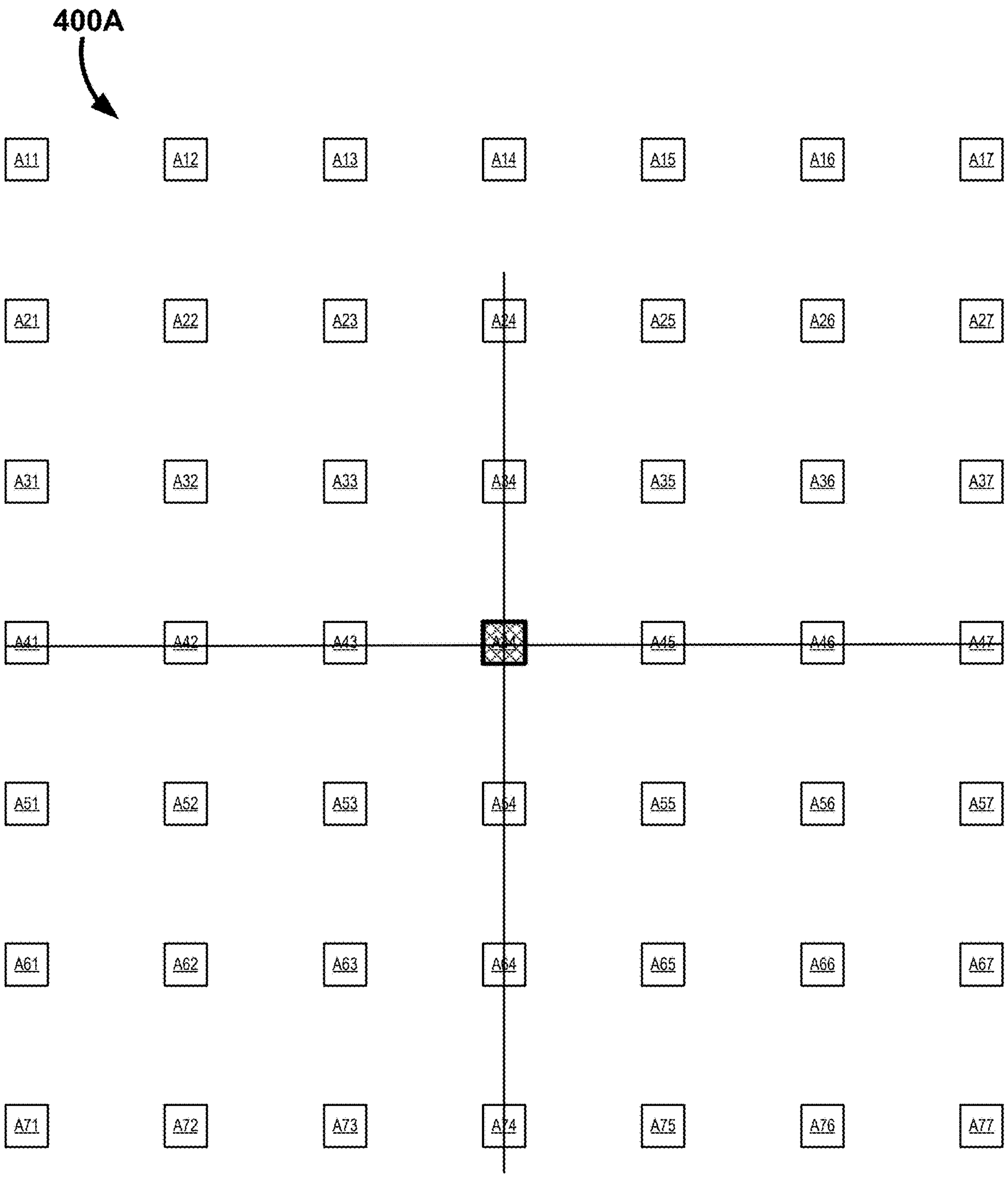
FIG. 4A is an example illustration of current interpolation methods for an integer pixel, in accordance with some embodiments.

Turning now to FIG. 4A, a first example diagram for current one-dimensional vertical and/or horizontal interpolation of an integer pixel 'A44' is provided, as seen generally at 400A. In some embodiments, an 8-tap filter is used to generate the integer pixel. For example, in the vertical direction A04, A14, A24, A34, A54, A64, A74 and A84 may be used to generate pixel A44.

Figure 4B:
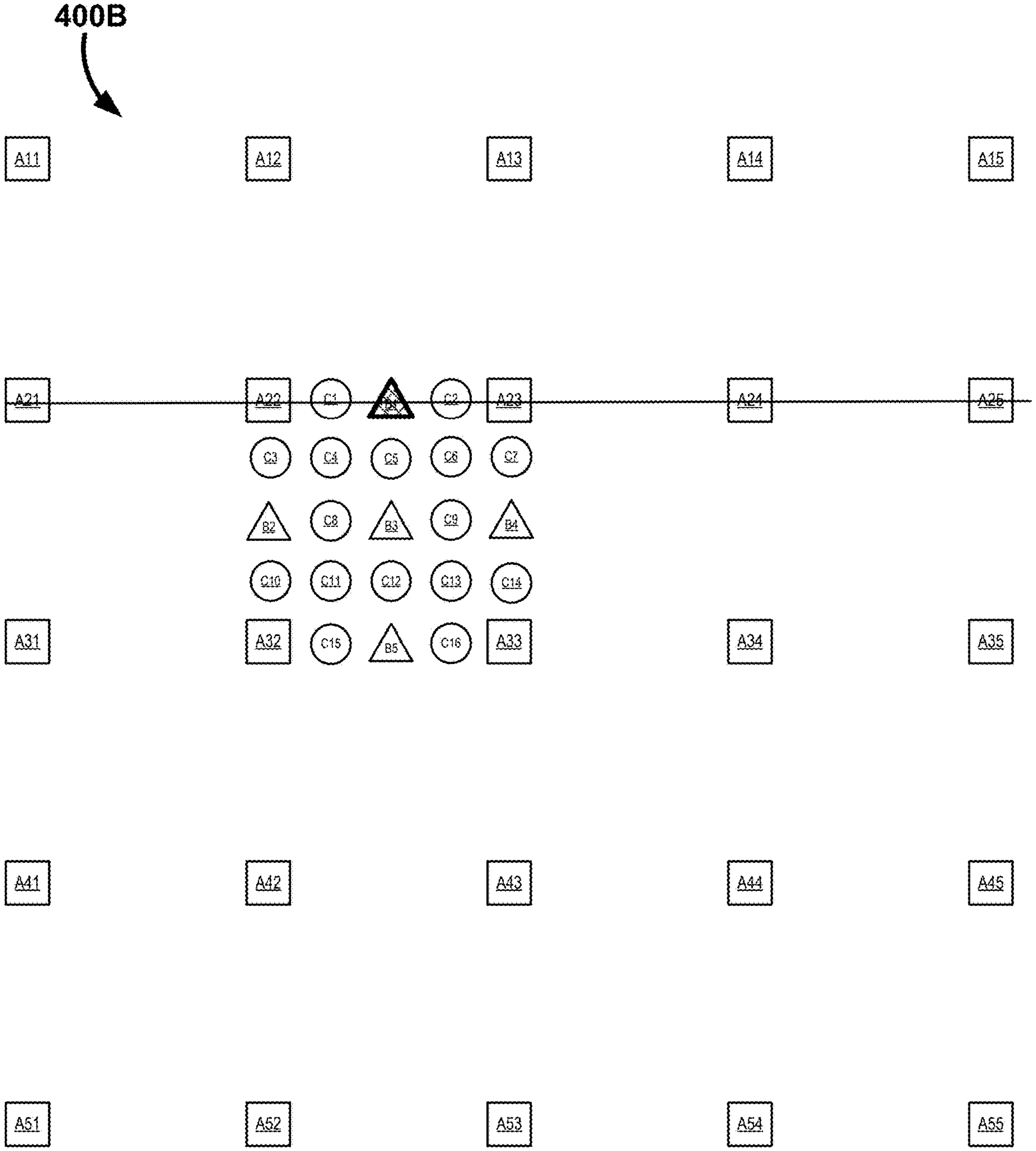
FIGS. 4B and 4C are example illustrations of current interpolation methods for a half pixel, in accordance with some embodiments.
Figure 4C:
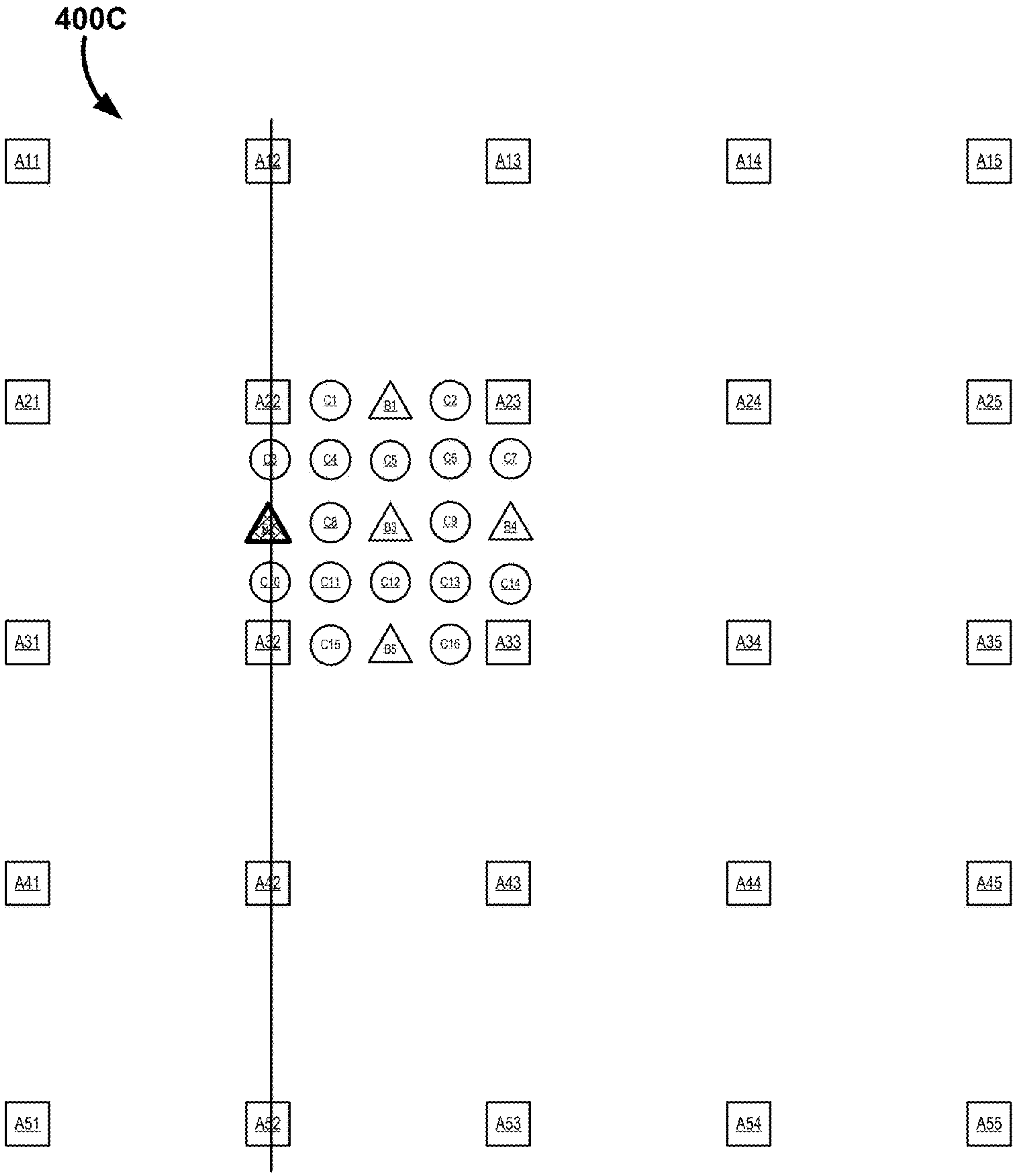

FIG. 4B shows current methods of half-pixel interpolation, as seen generally at 400B. In this example diagram half pixel 'B1' is being generated using a horizontal 6-tap filter. Integer pixels A20, A21, A22, A23, A24 and A25 may be used to generate half pixel B1. Turning to FIG. 4C, half pixel B2 is generated by a 6-tap filter along the vertical direction using integer pixels A02, A12, A22, A32, A42 and A52, as seen generally at 400C. In other embodiments, 8-tap filtering may be employed to generate the half-pixels. For a half pixel that is not in line with an integer pixel, such as 'B3', a 6-tap filter, or an 8-tap filter, with half pixels along either the horizontal direction or vertical direction may be employed.

Figure 4D:
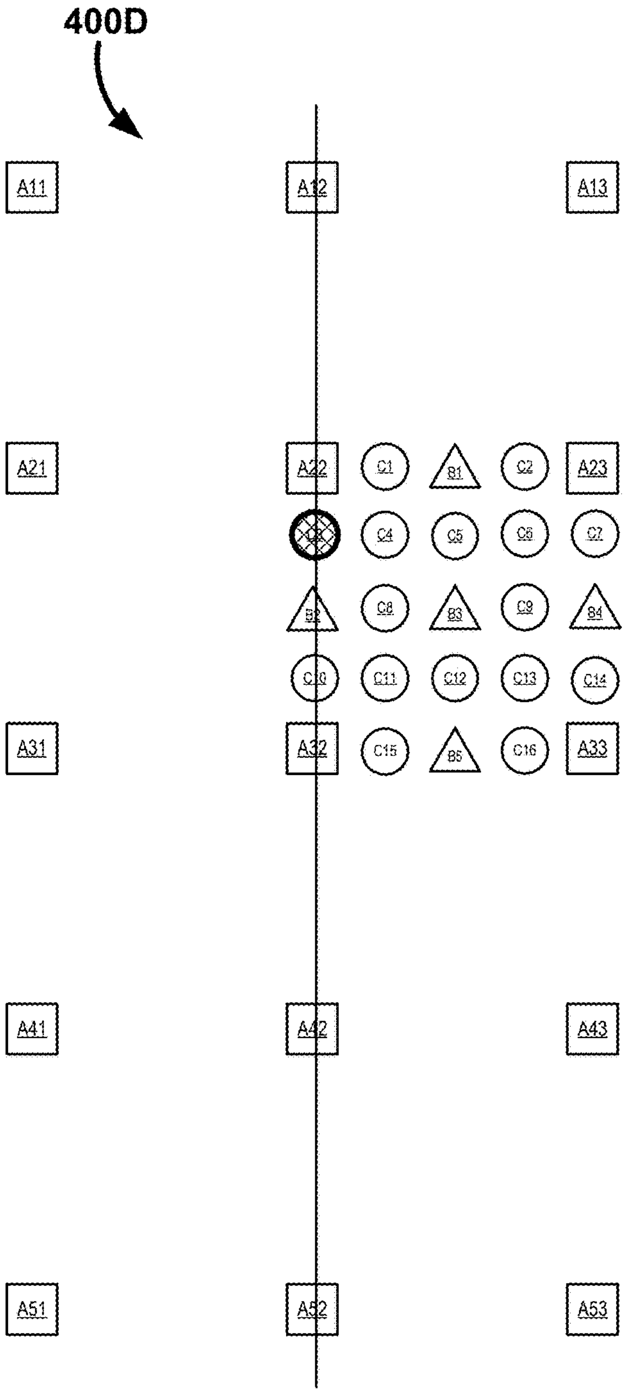
FIGS. 4D and 4E are example illustrations of current interpolation methods for a quarter pixel, in accordance with some embodiments.
Figure 4E:
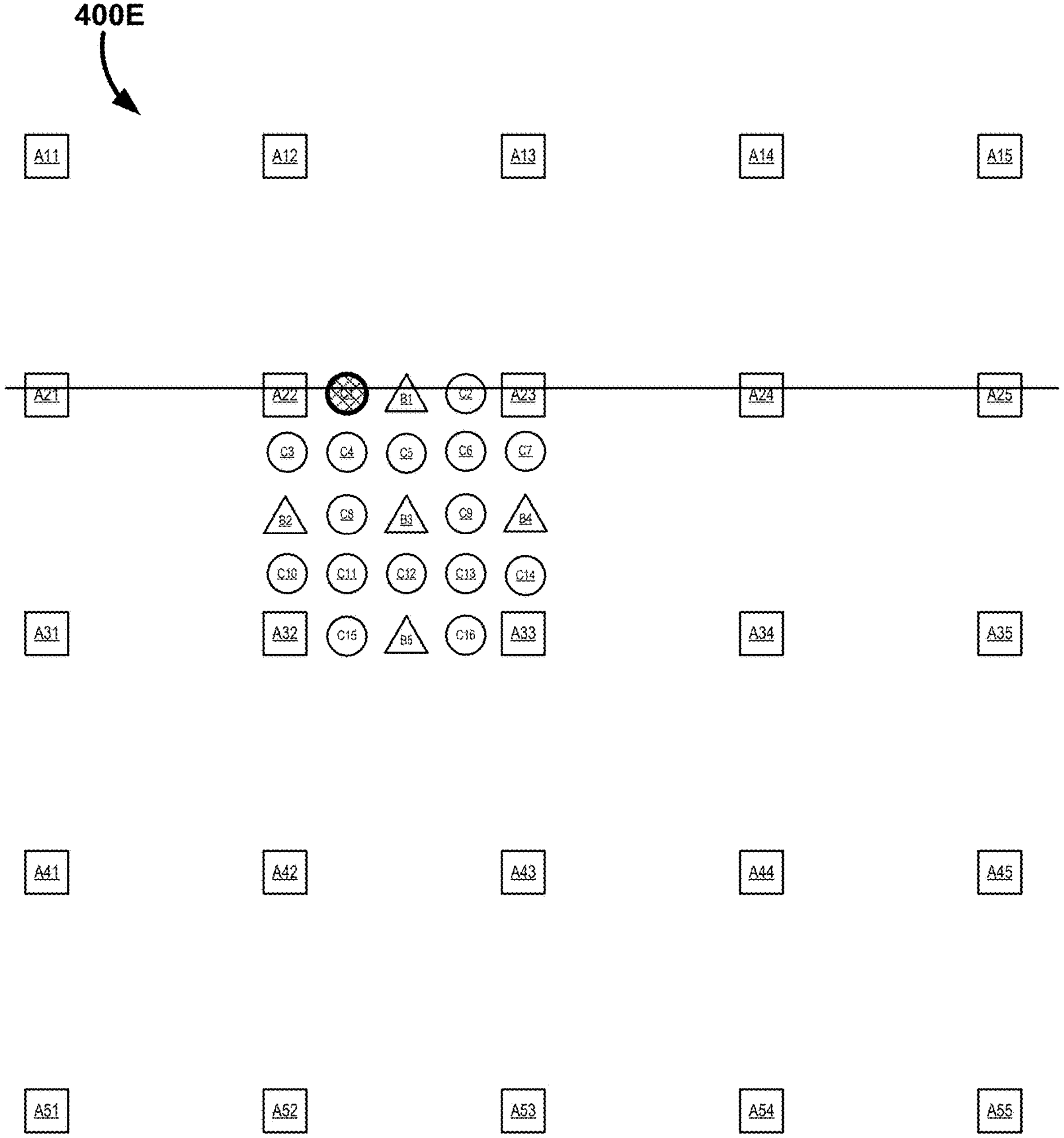

Quarter pixel interpolation may be performed using bilinear interpolation with neighboring integer and half pixels. In alternate embodiments, a 7-tap filter may be employed to generate quarter-pixels. FIG. 4D provides an example illustration of such a technique, whereby quarter pixel 'C3' is identified using integer pixels in the horizontal direction using a 7-tap filter, as seen generally at 400D. Here quarter pixel 'C3' is identified by A-12, A02, A12, A22, A32, A42 and A52. Quarter pixel 'C1' is generated by A2-1, A20, A21, A22, A23, A24, and A25, as seen in FIG. 4E at 400E.

Figure 5:
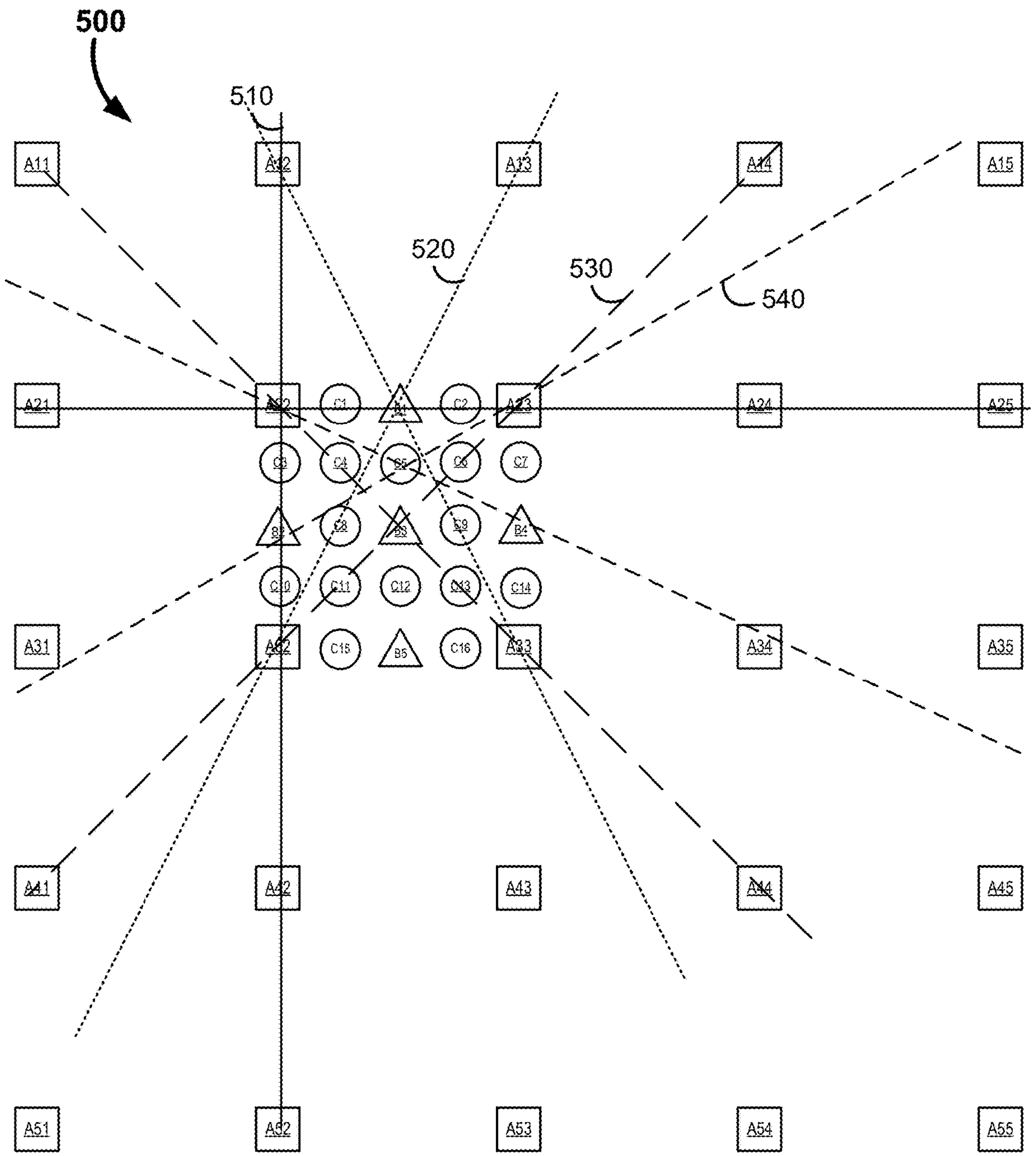
FIG. 5 is an example illustration of directional interpolation filtering, in accordance with some embodiments.

The present systems and methods diverge from these vertical and horizontal interpolations by allowing directional interpolation filtering. FIG. 5 provides an example illustration where directional interpolation filtering is applied, as seen generally at 500. Directional interpolation allows any angle ($\alpha$) to be chosen and the integer pixels in line with this angle are used to interpolate the pixel of interest. For example, half pixel 'B3' may be interpolated along the angle of 45°, illustrated by the long-dashed line 530. For this pixel 'B3' along $\alpha$45, the pixels A14, A23, A32, A41 and A50 may be utilized, for example, to generate the pixel. For half pixel 'B1' the small-dotted line 520 may be utilized. For quarter pixel 'C5' the dashed-line 540 illustrates yet another interpolation direction. Lastly, for vertical and horizontal interpolation may still be employed, as seen at lines 510. For any fractional-pixel there is always some integer-pixels with a specific $\alpha$ that may be identified. Thus, it is possible to interpolate the fractional-pixel using integer-pixels in a single step (as opposed to the current state of the art which requires two interpolation steps).

Figure 6A:
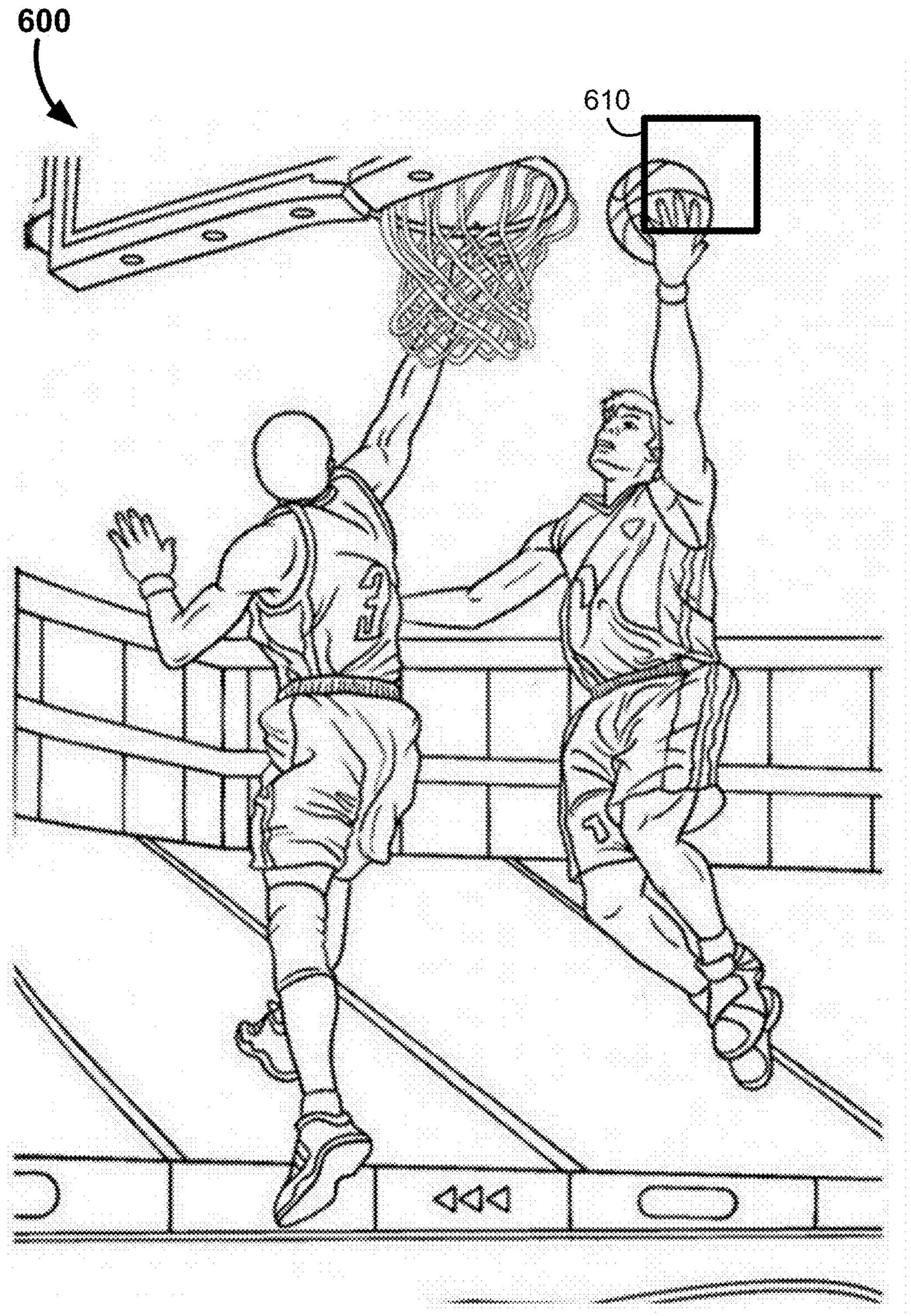
FIGS. 6A and 6B are example illustrations of an example video frame with a region of interest for interpolation, in accordance with some embodiments.
Figure 6B:
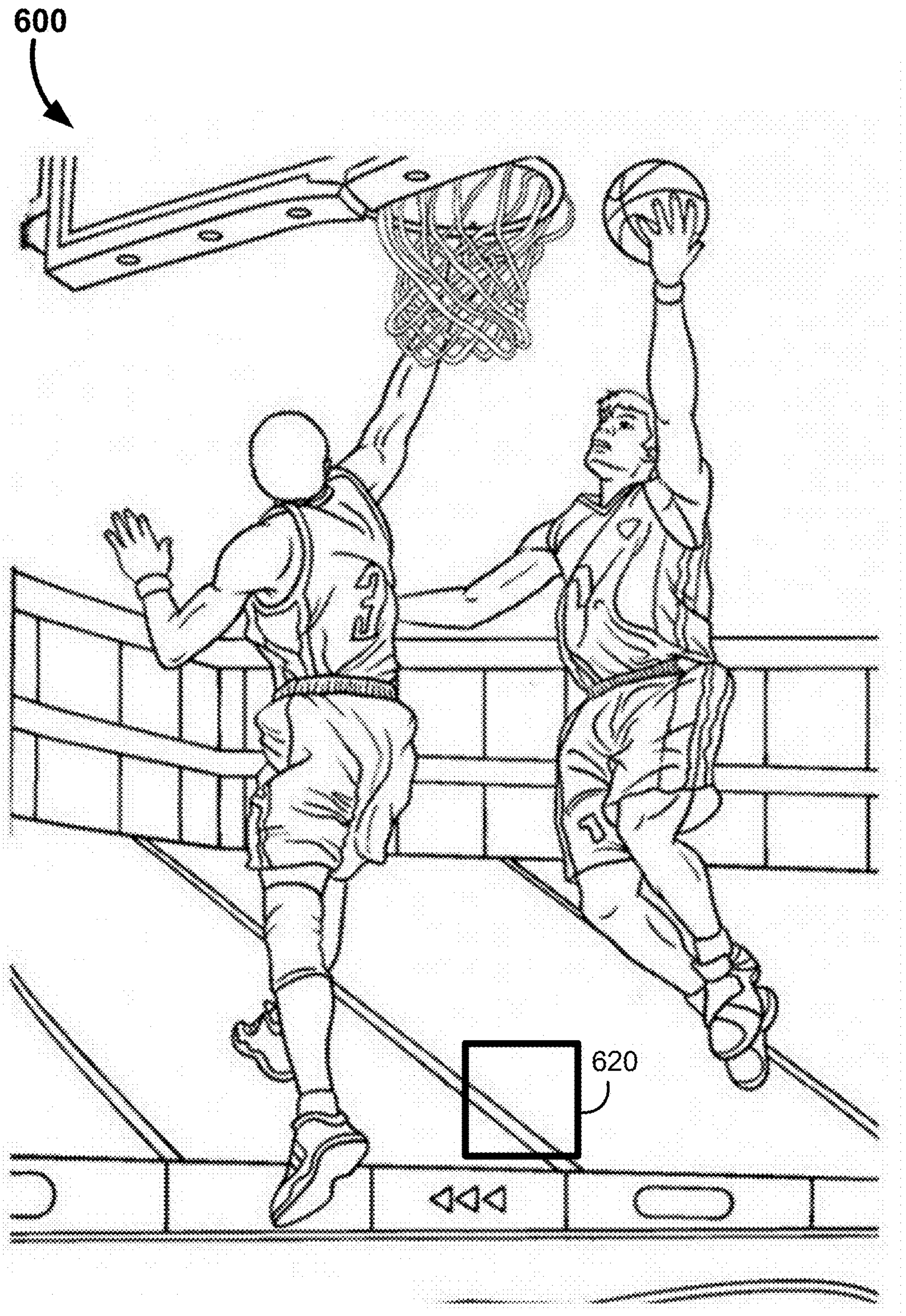

Another advantage of the directional interpolation is that the direction $\alpha$ may be selected for given the fractional-pixel. This allows the system to select the "best" direction $\alpha$ for interpolation based upon picture features. The selected direction $\alpha$ is provided to the decoder. For example, FIGS. 6A and 6B illustrate a picture of two men playing basketball, seen generally at 600. In FIG. 6A, a region of interest 610 is selected for. In FIG. 6B, a different region of the image is selected as a region of interest 620. In the first region of interest 610, it is difficult to find a good direction for the pixels in the block to do an interpolation. Conversely, with region of interest 620, there is a clear edge in a particular direction. When these natural texture angles exist, it is better to interpolate along the texture direction, as opposed to vertically or horizontally. The system may employ edge detection or other predictive methods to derive the interpolation direction $\alpha$ at both the encoder and decoder without sending syntaxes. In regions where there is no natural textural direction, such as at region 610, the system may rather do a rough estimate of pixel value of the sub-pixel position by either nearest method of cubic interpolation. Next, for the similar integer-pixel, in terms of pixel value, within a predefined range, will be collected and a weighted average is used to predict the current sub-pixel value location. The weight may be determined adaptively according to pixel distance of difference.

Filter tap size decisions may be made based upon a desired precision level. Longer filter taps generally preserve higher frequencies. Since the system can interpolate along texture directions, it is possible to interpolate using a smaller filter size and yet maintain high precision. When a filter is going against a texture direction, the system may modulate the filter tap to be longer to preserve high frequency energy.

It is also possible to generate sub-pixels when needed to interpolate along a specific direction α when there are not integer-pixels present. For example, returning to FIG. 5, assume half-pixel 'B1' is to be interpolated, and the texture direction for the image is in the α 45°. As there are no integer pixels in this direction α, the system may first derive a sub-pixel 'C6' which is in the direction of 45° using integer-pixels. Once 'C6' has been generated, it may be used to interpolate pixel 'B1' along direction 45° with a longer filter tap.

In yet other embodiments, instead of fixed coefficients for the tap length, the system may utilize on-the-fly trained filter tap coefficients by sending all the coefficients to the decoder. In such embodiments, the encoder can directly encode the filter taps in the slice header of picture header. Once the decoder decodes the filter taps it can perform the interpolation accordingly. Coefficients may then vary by frame to frame or batch by batch, or fixed for the entire sequence. This versatility in tap coefficients allows the desired precision to be met for each frame, while minimizing bitrates where possible.

Figure 7:
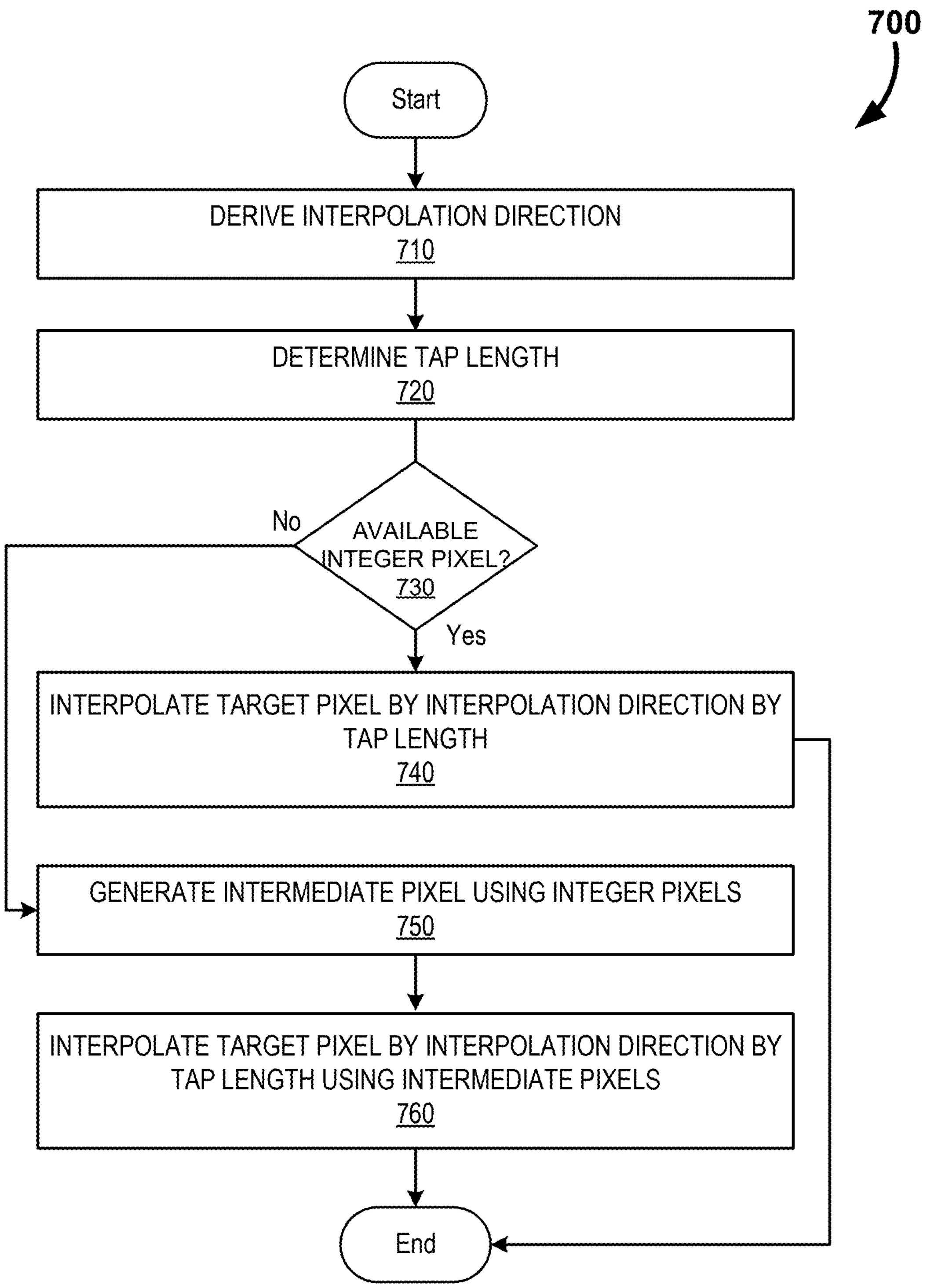
FIG. 7 is a flow diagram for an example process of directional interpolation filtering, in accordance with some embodiments.
Figure 8:
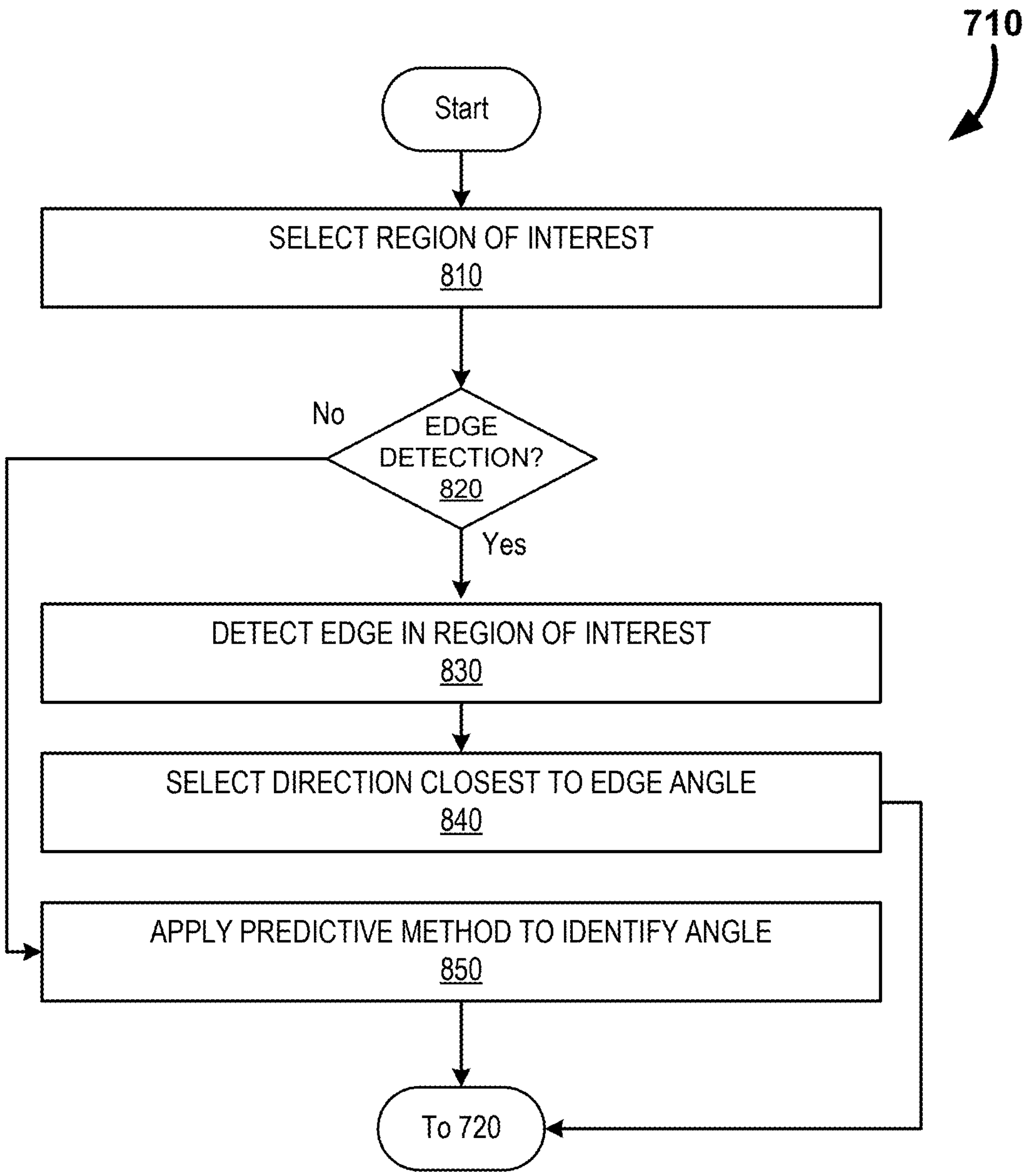
FIG. 8 is a flow diagram for an example sub-process of deriving the interpolation direction, in accordance with some embodiments.
Figure 9:
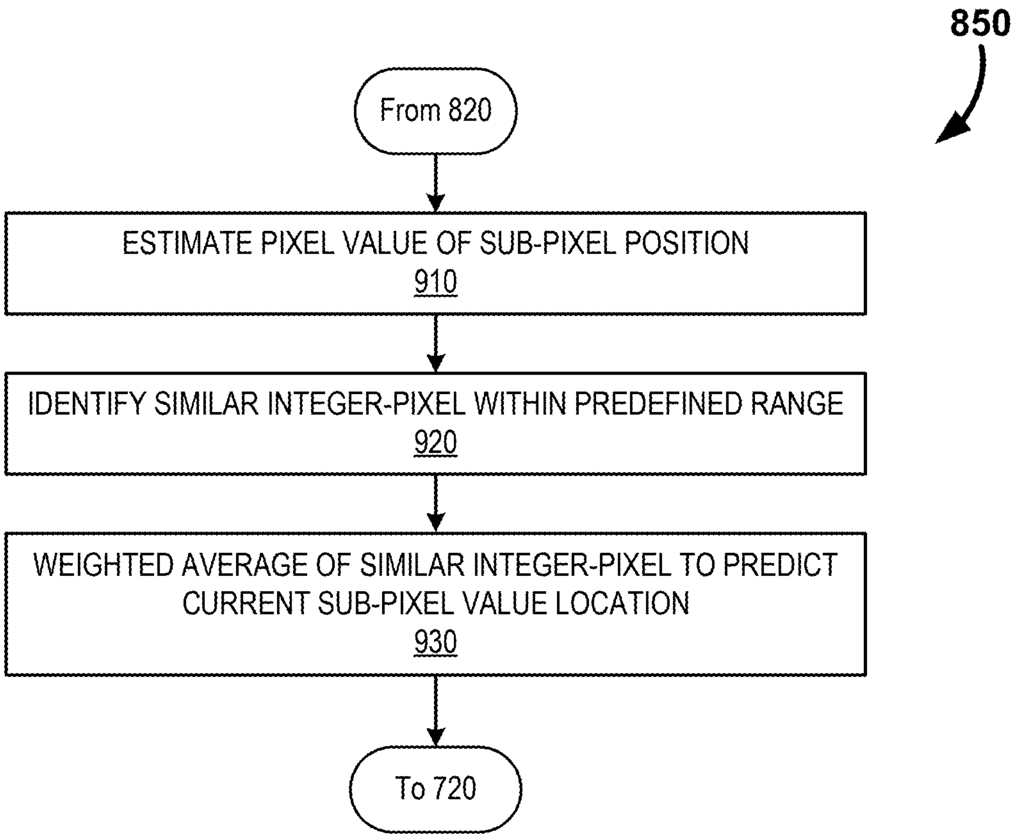
FIG. 9 is a flow diagram for an example process of predicting current sub-pixel value location, in accordance with some embodiments.

Turning to FIG. 7, a flowchart 700 of an example process for directional interpolation is provided. In this example process, initially the interpolation direction is derived, at 710. FIG. 8 provides more detail into the process of deriving the interpolation direction. Initially, the region of interest for interpolation is selected, at 810. A determination is made whether edge detection is applicable given the content of the region of interest, at 820. If edges are clearly present, the system may detect the edge(s) in the region of interest, at 830. Then the system may select a directional angle that is closest to the angle of the edge that was detected, at 840. If no clear edge(s) are detectable in the region of interest, however, the system may apply predictive methods to identify the angle, at 850. These predictive methods are provided in greater detail in relation to FIG. 9, and include estimating the pixel value of the sub-pixel position using either the nearest method or cubic interpolation, at 910. Then the similar integer-pixel, in terms of pixel value, is identified within a predefined range, at 920. This pixel is collected and a weighted average is used to predict the current sub-pixel value location, at 930. Weights may be determined adaptively according to either pixel distance or pixel difference.

Regardless of the method applied to determine the interpolation angle, the next step in FIG. 7 is to determine tap length. Tap length may be a fixed value intended to balance bitrates and precision. In some embodiments, the tap length may be dynamic. When the angle of interpolation aligns well with the texture direction, for example, a shorter tap length may be employed. For directional angles not in line with a texture direction, longer tap lengths may be applied. On the fly trained filter tap coefficients may be utilized by sending all coefficients to the decoder where it decodes the filter taps first and then uses the same methodology that the encoder uses to derive the best filter taps. Alternatively, the encoder can send the filter tap choice to the decoder and the decoder merely decodes the choice and utilizes the choice.

Next the system determines if there are integer pixels available along the selected angle, at 730. If so, then the system interpolates the target pixel by the interpolation direction and tap length referencing the existing integer pixels, at 740, thereby concluding the directional interpolation process. However, if there are not integer pixels available along the direction angle, the system may need to generate intermediate pixels using the integer pixels, at 750. The target pixel may then be interpolated by the interpolation angle and tap length desired using the intermediate pixels that were generated, at 760, again concluding the process.

Figure 10A:
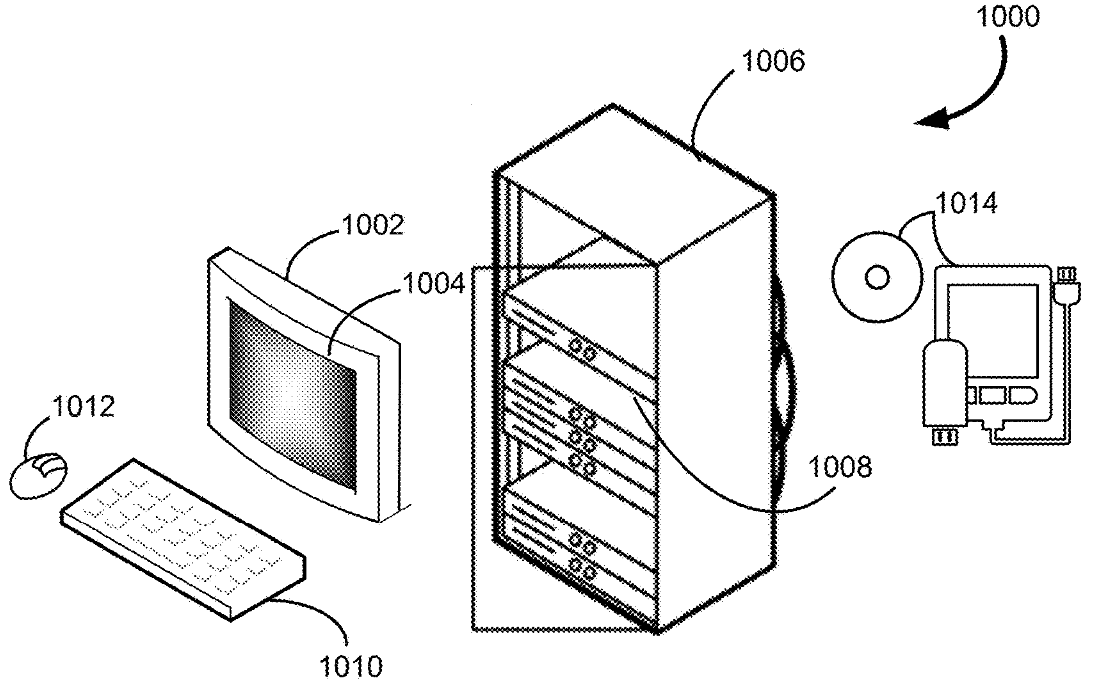
FIGS. 10A and 10B are illustrations of computer systems capable of implementing the directional interpolation filtering, in accordance with some embodiments.
Figure 10B:
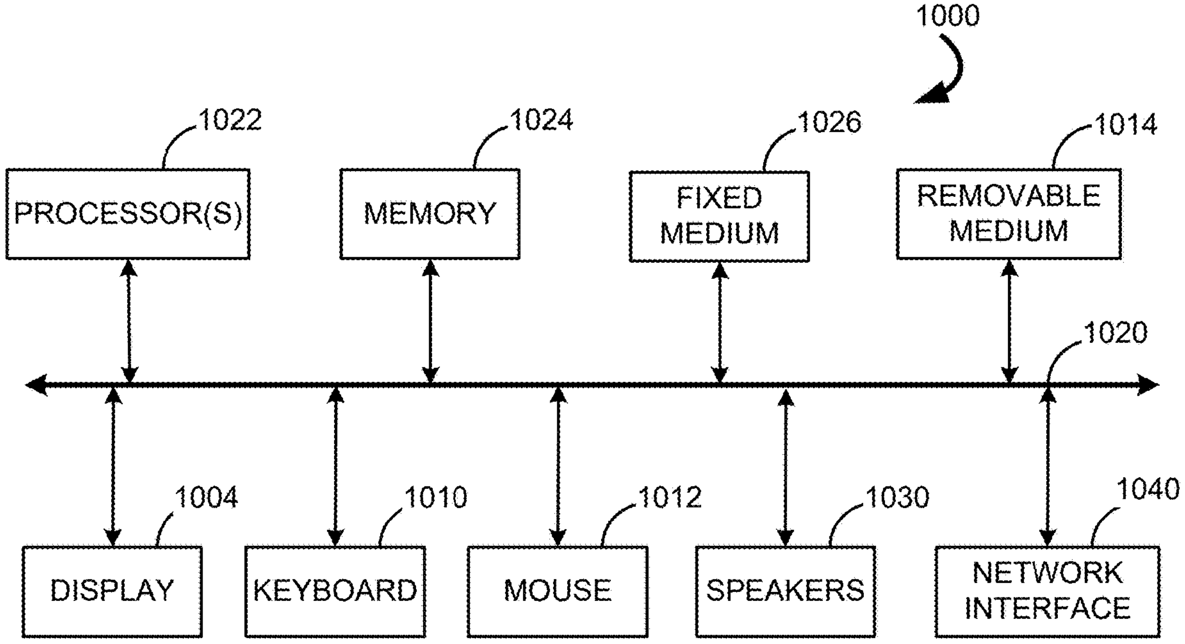

Now that the systems and methods for directional interpolation filtering has been provided, attention shall now be focused upon apparatuses capable of executing the above functions in real-time. To facilitate this discussion, FIGS. 10A and 10B illustrate a Computer System 1000, which is suitable for implementing embodiments of the present invention. FIG. 10A shows one possible physical form of the Computer System 1000. Of course, the Computer System 1000 may have many physical forms ranging from a printed circuit board, an integrated circuit, and a small handheld device up to a huge supercomputer. Computer system 1000 may include a Monitor 1002, a Display 1004, a Housing 1006, server blades including one or more storage Drives 1008, a Keyboard 1010, and a Mouse 1012. Medium 1014 is a computer-readable medium used to transfer data to and from Computer System 1000. FIG. 10B is an example of a block diagram for Computer System 1000. Attached to System Bus 1020 are a wide variety of subsystems. Processor(s) 1022 (also referred to as central processing units, or CPUs) are coupled to storage devices, including Memory 1024. Memory 1024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 1026 may also be coupled bi-directionally to the Processor 1022; it provides additional data storage capacity and may also include any of the computer-readable media described below. Fixed Medium 1026 may be used to store programs, data, and the like and is typically a secondary storage medium (such as a hard disk) that is slower than primary storage. It will be appreciated that the information retained within Fixed Medium 1026 may, in appropriate cases, be incorporated in standard fashion as virtual memory in Memory 1024. Removable Medium 1014 may take the form of any of the computer-readable media described below.

Processor 1022 is also coupled to a variety of input/output devices, such as Display 1004, Keyboard 1010, Mouse 1012 and Speakers 1030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1022 optionally may be coupled to another computer or telecommunications network using Network Interface 1040. With such a Network Interface 1040, it is contemplated that the Processor 1022 might receive information from the network, or might output information to the network in the course of performing the above-described directional interpolation filtering methods. Furthermore, method embodiments of the present invention may execute solely upon Processor 1022 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1000 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for directional interpolation is provided comprising:

determining an angle of directional interpolation for a given pixel in a region of interest;

determining a tap length for the pixel interpolation;

interpolating the pixel along the angle by the determined tap length when an edge is present; and when no edge is present estimating a value for the pixel and collecting and weighting a similar integer-pixel within a predefined range to determine current sub-pixel value location.

2. The method of claim 1, wherein determining the angle includes performing edge detection for a textural edge in the region of interest and aligning the angle with an angle for the detected edge.

3. The method of claim 1, wherein the angle is determined by applying a predictive method.

4. The method of claim 3, wherein the predictive method includes:

estimating a pixel value of a sub-pixel position;

identifying a similar integer pixel within a predefined range;

predicting current location of the sub-pixel using a weighted average of the similar integer pixel.

5. The method of claim 4, wherein weights used in the weighted average are determined by at least one of distance between the similar integer pixel and the current location of the sub-pixel and difference between the similar integer pixel and the current sub-pixel.

6. The method of claim 1, wherein the determining tap length is an optimization between tap size and desired precision.

7. The method of claim 6, wherein the tap length is shorter when the angle is aligned with a textural angle for the region of interest and longer when the angle is not aligned with the textural angle.

8. The method of claim 6, wherein the tap length is an on-the-fly trained filter tap coefficient derived by sending all coefficients to a decoder.

9. The method of claim 1, wherein the interpolating the pixel along the angle by the determined tap length includes interpolation along the angle of integer pixels.

10. The method of claim 1, wherein interpolating the pixel along the angle by the determined tap length includes deriving at least two intermediate pixels from integer pixels, and interpolation along the angle of the at least two intermediate pixels.

11. A computerized system for directional interpolation comprising:

a server configured to determine an angle of directional interpolation for a given pixel in a region of interest, and determine a tap length for the pixel interpolation; and a filter configured to interpolate the pixel along the angle by the determined tap length when an edge is present, and when no edge is present estimating a value for the pixel and collecting and weighting a similar integer-pixel within a predefined range to determine current sub-pixel value location.

12. The system of claim 11, wherein determining the angle includes performing edge detection for a textural edge in the region of interest and aligning the angle with an angle for the detected edge.

13. The system of claim 11, wherein the angle is determined by applying a predictive method.

14. The system of claim 13, wherein the predictive method includes:

estimating a pixel value of a sub-pixel position;

identifying a similar integer pixel within a predefined range;

predicting current location of the sub-pixel using a weighted average of the similar integer pixel.

15. The system of claim 14, wherein weights used in the weighted average are determined by at least one of distance between the similar integer pixel and the current location of the sub-pixel and difference between the similar integer pixel and the current sub-pixel.

16. The system of claim 11, wherein the determining tap length is an optimization between tap size and desired precision.

17. The system of claim 16, wherein the tap length is shorter when the angle is aligned with a textural angle for the region of interest and longer when the angle is not aligned with the textural angle.

18. The system of claim 16, wherein the tap length is an on-the-fly trained filter tap coefficient derived by sending all coefficients to a decoder.

19. The system of claim 11, wherein the interpolating the pixel along the angle by the determined tap length includes interpolation along the angle of integer pixels.

20. The system of claim 11, wherein interpolating the pixel along the angle by the determined tap length includes deriving at least two intermediate pixels from integer pixels, and interpolation along the angle of the at least two intermediate pixels.

* * * * *